United States Patent [19]

Standler

[11] Patent Number: 4,586,104
[45] Date of Patent: Apr. 29, 1986

[54] PASSIVE OVERVOLTAGE PROTECTION DEVICES, ESPECIALLY FOR PROTECTION OF COMPUTER EQUIPMENT CONNECTED TO DATA LINES

[75] Inventor: Ronald B. Standler, Albuquerque, N. Mex.

[73] Assignee: RIT Research Corp., Rochester, N.Y.

[21] Appl. No.: 560,710

[22] Filed: Dec. 12, 1983

[51] Int. Cl.$^4$ .................... H02H 9/04; H02H 9/06
[52] U.S. Cl. ........................ 361/91; 361/56; 361/119
[58] Field of Search .............. 361/54, 55, 56, 91, 361/110, 111, 119, 402, 406; 336/232

[56] References Cited

U.S. PATENT DOCUMENTS

| | | | |
|---|---|---|---|
| 2,789,254 | 4/1957 | Bolle et al. | |
| 3,372,285 | 3/1968 | Blazek et al. | 361/111 X |
| 3,793,535 | 2/1974 | Chowdhuri | 361/56 X |
| 3,890,543 | 6/1975 | Jonassen | 361/56 |
| 3,934,175 | 1/1976 | Clark | 361/118 X |
| 4,068,277 | 1/1978 | Simokat | 361/55 |
| 4,068,281 | 1/1978 | Harnden, Jr. | 361/106 |
| 4,075,591 | 2/1978 | Haas | 336/232 X |
| 4,325,097 | 4/1982 | Clark | 361/56 |
| 4,389,695 | 6/1983 | Carpenter, Jr. | 361/56 X |

FOREIGN PATENT DOCUMENTS

| | | | |
|---|---|---|---|
| 3027469 | 2/1982 | Fed. Rep. of Germany | 361/56 |
| 2382787 | 11/1978 | France | 361/56 |
| 982130 | 2/1965 | United Kingdom | 361/54 |
| 725143 | 3/1980 | U.S.S.R. | 361/91 |

OTHER PUBLICATIONS

"Grounding, Bonding, and Shielding for Electronic Equipment and Facilities", DOD Handbook, vol. 11, of 2 volumes—Applications, 1/21/82.
"Transient Voltage Suppression", 3rd Edition—General Electric.
"Suppression of Fast Rise-Time Transients—Clark, General Semiconductor Industries, Inc.
"Semiconductor Devices in Hostile Electrical Environments"—Knox.
"Lighting Protection of Line Repeaters"—Popp.
Polyswitch Devices-A New Low Resistance Conductive Polymer-Based PTC Device for Overcurrent Protection"—Doljack.
"Electrical Transients in Power Systems"—Greenwood.
"PTC-Positive Temperature Coefficient Thermistors", Keystone Catalog.
"Effect of Lead Wire Lengths on Protector Clamping Voltages"—Clark et al—1979, Federal Aviation Administration Workshop on Grounding and Lightning Technology—report FAA-RD-76-6, Mar. 6-8, 1979, pp. 69-73.
"Current Protectors Take on Surges Without Resetting or Replacement"—Ballog, Electronics, 1/13/81, pp. 159-162.
Elektrie 32 (1978), Jrg. 32, No. 7, pp. 377-379.
IBM Technical Disclosure Bulletin, vol. 21, No. 9, 2/79.

Primary Examiner—Harry E. Moose, Jr.
Attorney, Agent, or Firm—M. Lukacher

[57] ABSTRACT

Overvoltage protection devices operative to prevent damage to electrical equipment in response to overvoltages in the form of fast transients and also to continuous overvoltages utilizes clamping or discharge elements which conduct in response to overvoltages or current surges. A high voltage responsive element, suitably a spark gap, is connected to the input of the device which goes to the line, while a lower voltage responsive element, suitably an avalanche diode or diodes or a zener diode or diodes, is connected to the output of the device which goes to the equipment to be protected. A resistor is connected between the spark gap and the avalanche device in series with one side of the line on the circuit to be protected. This resistor is preferably a positive temperature coefficient resistor which changes resistance rapidly to a high resistance state when the avalanche device conducts so as to protect the avalanche device while allowing the development of overvoltages sufficient to cause breakdown and conduction in the spark gap. Fast overvoltage transients are protected against by inductance between the avalanche device and the output that is greater than the inductance in the shunt path provided by the avalanche device.

25 Claims, 8 Drawing Figures

PASSIVE OVERVOLTAGE PROTECTION DEVICES, ESPECIALLY FOR PROTECTION OF COMPUTER EQUIPMENT CONNECTED TO DATA LINES

DESCRIPTION

The present invention relates to overvoltage protection devices, and particularly to an overvoltage protection device which is purely passive and which protects against both fast transients, as well as continuous overvoltages.

The invention is especially suitable for protecting computer equipment, particularly computer interfaces or terminals which are interconnected by long connecting cables or transmission lines and which operate in accordance with standard protocols such as the RS-232 for serial unbalanced lines and interfaces and the RS-422 for serial balanced data lines and interfaces.

When computer terminals are located a long distance from the computer, transient voltages can enter the connecting cables and damage the interface hardware. Such transient overvoltages are commonly caused by lightning but they may, however, be due to electrostatic discharge or electromagnetic pulses and be very fast, having rise times of nanoseconds to microseconds. In addition, overvoltages may be sustained over long periods of time. For example, cloud to ground lightning can have long continuous currents of the order of 100 amperes for the duration between 0.04 and 0.5 seconds. Overhead power lines may sag or fall and touch the lines on which the data is transmitted. This will inject sustained overvoltages which may, unless protected against, enter the computer directly or through a modem. Overvoltages may also result from accidental connections, for example, of telephone lines to computer data lines. There is also the possibility of malicious damage or sabotage by the connection of a high voltage or current source (e.g. the 120 V power lines) to a computer data line.

The problem therefore presents itself to protect equipment, and particularly sensitive computer hardware, from overvoltages across the gamut from extremely fast transients to sustained overvoltages.

An approach which has been taken for overvoltage protection is to use different elements which conduct at different voltages. Typically, an avalanche or a zener diode is selected to conduct before the voltage across the protected equipment exceeds the rating of that equipment. An element which conducts at a higher voltage, typically a spark gap, protects the diode from high currents which could destroy that diode. Such devices are described in U.S. Pat. No. 2,789,254 issued Apr. 16, 1957 and U.S. Pat. No. 3,934,175 issued Jan. 20, 1976. The device of the latter patent utilizes a delay circuit including an inductor and a resistor in series between the spark gap and the zener diode to allow them to respond independently and conduct at their respective higher and lower voltages. It has also been suggested to use positive temperature coefficient resistors for overcurrent protection in a protected circuit (see an article by Frank A. Doljack, IEEE Transactions on Components, Hybrids and Manufacturing Technology, vol. CHMT-4, No. 4, December, 1981, p. 372, and particularly p. 377). For fast transients, however, overvoltages may appear at the output of the circuit to be protected before either the avalanche device or the spark gap conducts. The failure of the elements to conduct promptly has been attributed to their inherent inductance which blocks the flow of transient currents. To that end, special avalanche devices in a special package having low shunt inductance have been suggested (see U.S. Pat. No. 4,325,097, issued Apr. 13, 1982).

It is desirable to use conventional elements such as spark gaps and avalanche diodes as protection elements, while, at the same time, accommodating overvoltages which run the gamut from continuous to very fast transients. The protection device must be kept small in size to be compatible with the computer equipment with which it is used. Desirably the protection device is used directly ahead of the interface. With many standard computer interfaces very little space is available, for example, the available space may be only a few inches long, a few inches wide, and less than an inch in height. The space limitations exacerbate the problem owing to the possibly large amount of energy to be dissipated.

It is an object of the present invention to provide a protective device which may be connected to the ends of lines and cables which interface with the electronic equipment for protecting the equipment from overvoltages appearing on the lines, whether fast transients or sustained overvoltages, whether with little energy or extremely large energy and high current, which is small in size so as to be compatible with the space available and the connectors used in standard interfaces, such as RS-232, and which utilizes standard circuit components.

A protection device provided in accordance with a feature of the invention utilizes inductance, in the path between an element which conducts in response to an overvoltage and the protected circuit, which presents higher inductance in series with the circuit than is presented in shunt by the protecting elements, such that fast transient overvoltages cause the protecting element to become conductive before an overvoltage reaches the protected circuit.

In accordance with another feature of the invention, the protection device utilizes a positive temperature coefficient resistor to protect a low power element, such as an avalanche device in shunt with the output of the device, which goes to the protected circuit to protect the avalanche device from sustained large currents while providing a low resistance during normal operation (no overvoltage condition).

A protection device provided in accordance with another feature of the invention utilizes a printed circuit card on one side of which the components are mounted and on the other side of which there are traces or printed conductors, which provide the protective inductance between the output and the element (e.g. the avalanche device) which conducts at lower voltage, by having a number of bends in and a length of the trace greater than the bends and the length of the bends in the shunt path provided by the conductive element.

A protection device provided in accordance with still further features of the invention utilizes the traces on the printed circuit card as well as bus bars to minimize inductance which might prevent operation of the elements of the circuit in their protective modes on fast transients.

Briefly described, an overvoltage protection device embodying the invention, for transient overvoltages which appear on a line connected to the input of the protection device, the line transmitting signals with respect to an electrical circuit connected to an output of the protection device, utilizes an element having a shunt resistance which decreases when an overvoltage is present on the line to a value much less than the resistance presented by the circuit connected to the output of the device. The protection device is enabled to handle very fast transients by means of having an inductance greater than the inductance presented to the line by the shunt element, which inductance is connected between the element and the output of the device.

The foregoing and other features, objects and advantages of the invention, as well as the presently preferred embodiments thereof, will become more apparent from a reading of the following description in connection with the accompanying drawings in which.

Figure 1:
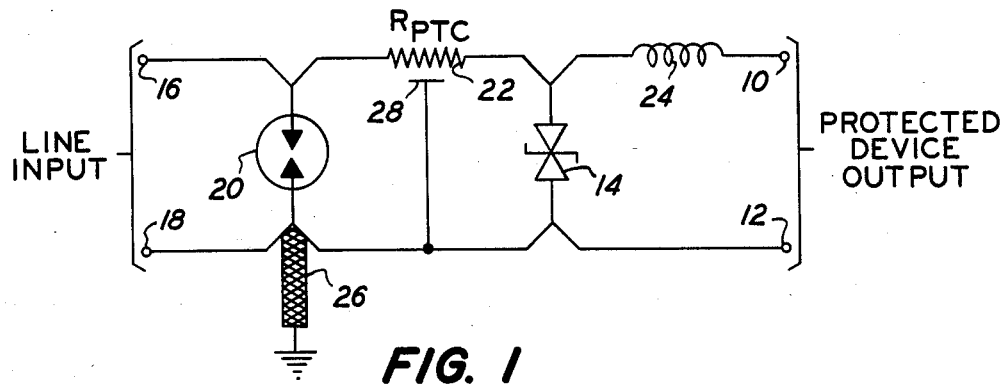
FIG. 1 is a schematic diagram illustrating a protection device in accordance with the invention.

Referring first to FIG. 1, there is shown a protection device for protecting one electrical circuit that is connected to one line. In the embodiment shown in FIGS. 2, 3 and 4, four such protection devices are incorporated in a single unit. The unit is capable of protecting four lines and four circuits. One side of each circuit is common and is connected to local ground. With the four sets of protection device circuits, the unit is suitable for protecting a standard asynchronous RS-232 interface for a computer or a computer terminal device (a modem, display, printer or keyboard, for example).

The protection device circuits shown in FIG. 1 is typical of each of the four in a RS-232 protection unit. The first of the basic components or elements used in the protection device is an element that decreases in resistance to a value much lower than the resistance presented by the protected circuit which is connected to the output terminals 10 and 12 of the device. This element is an avalanche device, illustrated as a bipolar avalanche diode 14. Two unipolar avalanche diodes connected in series; for example with their cathodes directly connected to each other, may be used. The avalanche device is connected in shunt with the protected circuit and also in shunt with the line which is connected to the input terminals 16 and 18 of the protection device. The avalanche device becomes conductive when an overvoltage is present that exceeds the avalanche device's breakdown voltage. The conduction process is very rapid when the breakdown voltage occurs. The avalanche device has a limited current carrying capacity and typically cannot dissipate more than 5 watts (steady-state) without destructing.

In order to carry higher currents another element, which presents a resistance much less than the resistance of the protected circuit connected to the output terminals 10 and 12, is connected in shunt with these terminals and with the line. This element has a breakdown or firing voltage much higher than the breakdown voltage of the avalanche device 14. While the metal oxide varistors, neon lamps, or other gas discharge tubes may be used, a spark gap 20 is preferred. When it fires, the spark gap 20 protects the avalanche device 14.

In order that the spark gap 20 fires before the avalanche device destructs, a resistor 22 is connected in series between the avalanche device 14 and the spark gap 20. The resistor is desirably connected in the side of the circuit which goes to the signal side of the line and the protected circuit, not the ground side. The resistance value of the resistor 22 is selected such that the firing voltage of the spark gap 20 is reached before the current through the avalanche device rises above its maximum rated current. Preferably the resistor 22 has a positive temperature coefficient. The resistor 22 is therefore labeled $R_{PTC}$ in the drawing. Suitable PTC resistors are commercially available from Murata Erie North America of Marietta, Ga. 30067 (e.g. their part numbers PTH60H01AR330M140) or from Raychem Corp. of Menlo Park, CA 94025. (e.g., their part number C24T002H.).

The PTC resistor 22 has the further advantage in that when the protection device is used on the transmitting end of the line, the resistor 22 forms a low pass filter with the line capacitance between the signal and common conductors of the line. For high speed data signals (e.g., 2400 to 9600 baud), the resistance of the resistor 22 should be as small as possible. The PTC resistor typically has values of resistance at room temperature between 20 and 50 ohms. Self heating provided when large currents flow through the protection device causes the temperature of the resistor to rise to its "switch temperature", the temperature at which the PTC's resistance begins to increase by about a factor of 10 for each 10 degrees (celsius) increase in temperature. After being switched the resistance is typically at least 3000 ohms. Accordingly, during normal operation, the protection circuit does not interfere with high speed communications. When operating in its protective mode to suppress sustained destructive transients and overvoltages, the resistor then switches to the high resistance required for protective purposes.

The shunt path to the spark gap 20 and avalanche diode 14 are shown defined by "V" like indentations in the diagram in order to denote that the shunt path through these elements 14 and 20 is made as short as possible to minimize the inherent inductance in the shunt path. The avalanche device 14 must operate in response to transient overvoltages with nanosecond risetimes. With such fast transients even the most careful circuit layouts, with short lead lengths to minimize inductance, are insufficient. Accordingly, the transient can bypass the avalanche device 14, because of the relatively high inductance presented to the fast transient by the shunt path including the avalanche device 14. The overvoltage can then reach the protected circuit and do permanent damage. To prevent this occurrence, an inductor element 24 is connected in the signal side of the circuit between the output terminal 10 and the avalanche device 14. The inductance presented by the element 24 is greater than the inductance in the shunt path including the avalanche device 14. Fast transients are then forced through avalanche device 14 and cause conduction under overvoltage conditions, thereby protecting the circuit that is connected to the output terminals 10 and 12. The inductor is preferably provided by printed conductors or traces having a length and a number of bends greater than, and preferably at least twice, the length and number of bends in the shunt path including the avalanche device 14. Suitable traces are illustrated in FIG. 3.

Inductance in the shunt path including the spark gap 20 may also divert or block voltages which should cause the firing thereof during fast transient overvoltage conditions. To this end the leads from the spark gap are made as short as possible. The spark gap 20 is mounted with its axis vertical to avoid right angle bends in its leads, as described more fully hereinafter. The lead of spark gap 20 that is connected to a printed circuit trace is folded over and connected along its length 36 to the trace (see, FIGS. 3 and 4a) so as to distribute the heat and increase the current carrying capacity of the trace. FIG. 3 shows how leads from each of the spark gaps (20a through 20d) are coincident with and connected to the traces. Also terminals at the upper ends of the spark gaps are connected to a bus bar 29 which in turn is connected to the common traces 31 on the printed circuit board thereby providing heavy short conductors to minimize inductance and provide high current carrying capacity; the current carrying capacity of the bus bar being much greater than that of the traces on the printed circuit board. Still further, a braided, flexible conductor 26 is provided which is connected to the bus bar and thence goes to an external ground, thereby assuring that heavy currents are shunted directly to ground before entering the protected area of the protection circuit, and of course not entering the area of the protected circuit.

With high voltage transients at the input terminals, the possibility exists of a discharge or flashover across the series elements. These elements are the resistors 22. To foreclose this possibility, a bus bar 33 that is connected to common conductor 31 is contiguous to the cases of resistors (22a through d in FIGS. 2, 3 and 4). A trace in a form of a band 28 is located on the side of the board opposite from the resistors 22. Trace 28 is integral with the common traces 31.

Figure 2:
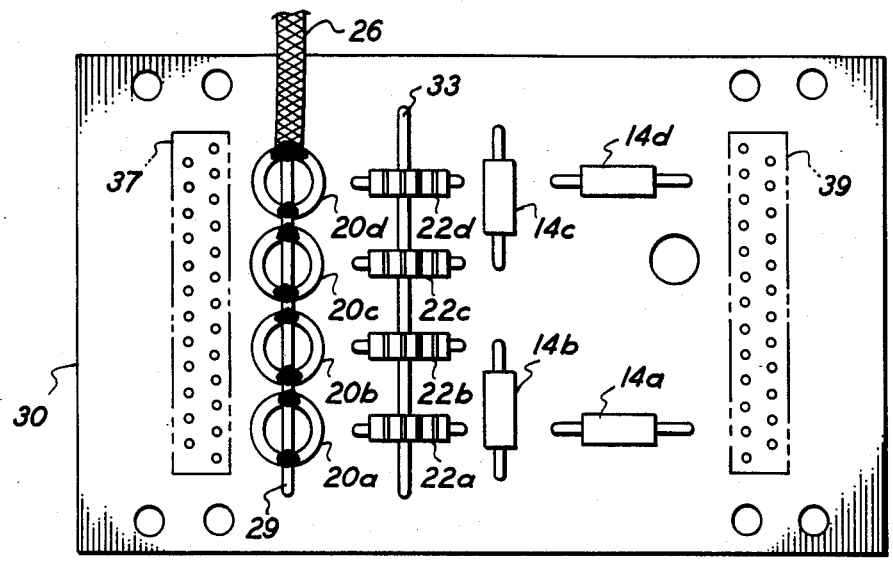
FIG. 2 is a top view showing a protection device in accordance with the invention which utilizes the circuit shown in FIG. 1 and in addition provides protection for four circuits connected by an RS-232 interface.
Figure 3:
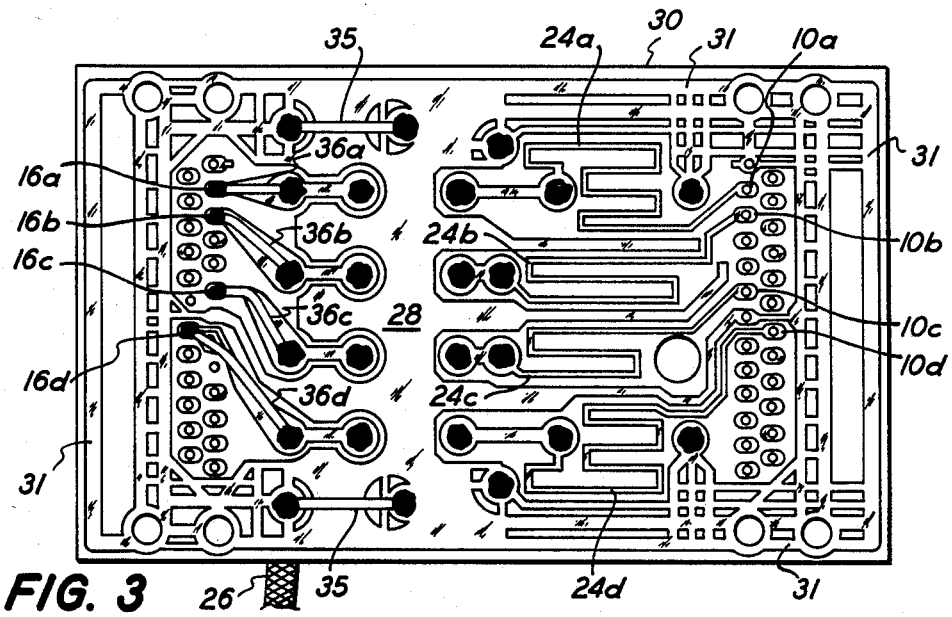
FIG. 3 is a bottom view of the protection device shown in FIG. 2.
Figure 4A:
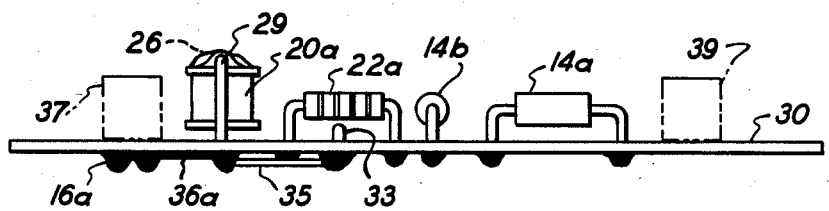
FIG. 4a is a side view and FIG. 4b is an end view of the protection device shown in FIGS. 2 and 3.
Figure 4B:
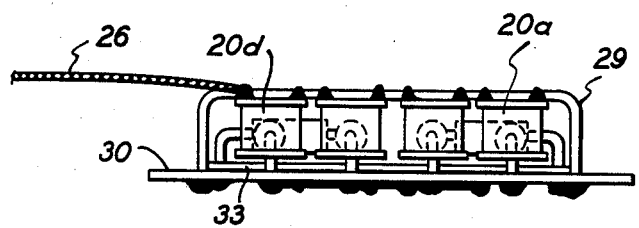

Referring more particularly to FIGS. 2, 3 and 4a and 4b, there is shown a printed circuit board unit containing the board 30 and four sets of components, which define protection circuits for four signal lines and a common line. 25 pin connectors 37 and 39 for RS-232 interfaces are illustrated in phantom in FIGS. 2, 3 and 4a. The pins from the connectors 37 and 39 extend through the board and are soldered to conductor traces on the bottom side of the board. All of the traces are located on the bottom side of the board. The spark gaps 20a through 20d are cylindrical and mounted with their axes in a vertical plane to minimize the length of the spark gap leads and remove the right angle bend in each lead that would otherwise be present. This minimizes the inductance in the shunt path (in series with) the spark gaps 20a to 20d.

The inductors 24a to 24d are provided by the long paths with several right angle bends in the printed circuit traces between the avalanche diodes 14a to 14d, where each inductor 24 is on the signal path between the diode and the output terminals 10a to 10d which go to the connector pins. This long trace has a length at least twice that of the avalanche diode's case connected thereto plus its leads. There are at least twice as many right angle bends in the traces which provide the conductors 24a to 24d than in the avalanche device shunt 14a to 14d between the signal side and common. Accordingly, the inductance in series with the output exceeds the inductance of the avalanche device shunt. Therefore, fast rise time pulses are prevented from propagating directly from the inputs 16a to 16d to the outputs 10a to 10d.

To intercept flash over, should it occur, the wide ground band 28 is provided, underneath the resistors 22a to 22d. The band 28 is connected to the common or ground side of the device. It is integral with the common traces 31. A length of solid bus bar wire 33 (22 to 16 AWG) on the top of the board under the resistors 22a–22d also guards against flashover. This wire 33 is also connected to the common traces 31 on the printed circuit board.

A bus bar 29 is also soldered to the common terminals on the upper side of all of the spark gaps. The braid 26 is soldered to the bus bar 29. Two parallel pieces of conductor may be used for the bus bar 29. This construction reduces the inductance in the shunt paths to ground provided by the spark gaps 20a to 20d and their leads. For convenience of assembly, bus bars 29, 33 and 35 are made of the same conductor. Part 35 is between Parts 29 and 33.

Intense peak currents create intense magnetic fields perpendicular to the signal conductors on the printed circuit board and concentrate current in a thin layer. This effect might cause the signal conductors to evaporate if the current density was sufficiently great, and is avoided by extending the spark gap leads 36a to 36d which go through the board and routing them for about 6 millimeters along the printed circuit board trace to the input terminals 16a to 16d.

The spark gaps 20 are suitably type 2027-15-B manufactured by the Joslyn Company of Goleta, CA. 93116, where these spark gaps have a DC firing potential between 120 and 180 volts. Spark gaps are prefered over gas tubes, such as neon lamps, since such lamps of reasonable size do not have the requisite current carrying capacity and can be shattered by a high current transient such as lightning. Other spark gaps with lower firing voltage may be used, however. Spark gaps with a 150 volt DC firing potential can typically remain non-conducting for about 0.5 to 1.0 microsecond when 300 volts is suddenly impressed across the gap, then operate in the glow region for about 0.5 to 1.5 microseconds, and then become fully conducting in the arc region. The brief non-conducting period of spark gaps with potentials across them that are several times their DC firing potential is accommodated by the avalanche devices 14. The spark gaps provide effective transient protection in shunting large currents, even of the order of 5 to 20 kiloamperes, away from the protected circuit.

The avalanche devices suitable for the RS232 application may be two avalanche diodes connected back to back, each of which has a breakdown voltage of approximately 18 volts. It has been found preferable to use 18 volt avalanche devices rather than 30 volt avalanche devices since they can safely shunt a larger transient current. The smaller avalanche device voltage also places less stress on the protected circuit.

Figure 5:
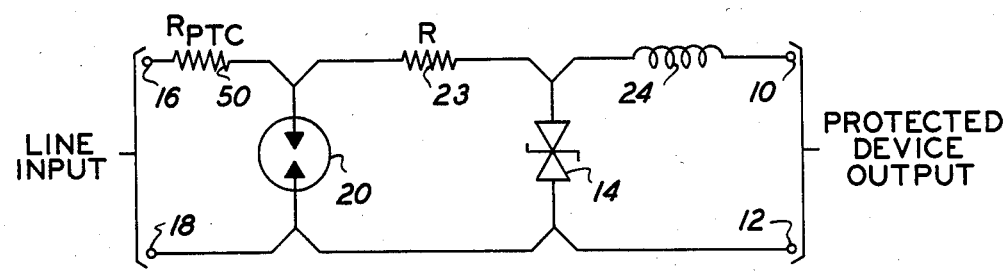
FIGS. 5, 6 and 7 are schematic diagrams illustrating protection devices in accordance with other embodiments of the invention.

Referring to FIG. 5, there is shown a protection circuit similar to the circuit shown in FIG. 1, and like parts are identified by like reference numerals. The resistor 23, not a like part to FIG. 1 where 22 was a PTC, may be an ordinary 1 or 2 watt carbon composition or wirewound resistor. A PTC resistor 50 is used in the signal side of the circuit between the spark gap 20 and the input signal terminal line 16. When sustained overvoltages, as may be caused by contact with power lines, occurs, the PTC resistor 50 switches to its high resistance state and protects the spark gap 20. As still further protection against such sustained overvoltages, and so called follow current, may be provided by placing a fuse or circuit breaker in series with the input terminal 16.

Figure 6:
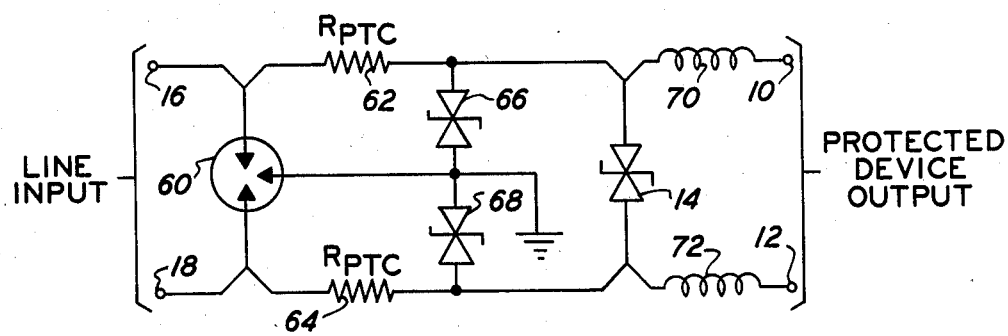

For balanced transmission lines, such as RS422 computer data lines, which are connected to the input terminals 16 and 18 the protection circuit shown in FIG. 6 may be used. The spark gap 60 preferably has three terminals with a common gas chamber. Alternatively, it may be two spark gaps connected in series. The center or common terminal of the spark gaps is connected to local ground about which the input lines and the protected circuit input are balanced. Each signal line has a positive temperature coefficient resistor 62 and 64 in series therewith between the spark gap 60 and a pair of bipolar avalanche devices 66 and 68 which are connected between local ground and each of the signal carrying paths in the device. These bipolar avalanche devices limit the maximum common-mode voltage at output terminals 10 and 12. An additional bipolar avalanche device 14 is connected in shunt with the output terminals 10 and 12 and between the two signal lines to minimize the maximum differential-mode output voltage between terminals 10 and 12.

Inductors 70 and 72 are also provided between the output terminals and the avalanche device 14 to guard against the propagation of fast transients before conduction in the avalanche devices.

Figure 7:
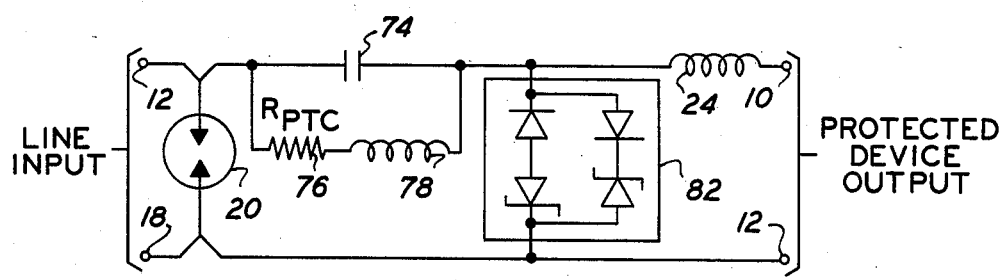

Referring to FIG. 7 there is shown a protection circuit which can operate with signals having frequencies from DC through the radio frequency range. This circuit includes a spark gap 20 connected in shunt with the input terminals 16 and 18 which go to the signal lines, and a semiconductor clamp 82 which is an extremely fast-acting clamp circuit with very small shunt capacitance. While any fast-acting low-capacitance clamp circuit may be used, the illustrated circuit having parallel connected oppositely polarized fast-recovery rectifiers and avalanche devices is suitable.

A capacitor 74, having a capacitance value which may be of the order of 1000 pF, isolates the clamp 82 from the spark gap 20. Many transients, including lightning, have little energy above a few megahertz, but other transients such as electrostatic discharges and nuclear electromagnetic pulse have a rise time of a few nanoseconds but may have little total energy. In the latter case, the semiconductor clamp 82 can absorb all of the transient energy without damage. Connected across the capacitor 74 is a PTC resistor 76 in series with an inductor 78. The inductor may have a few microhenries inductance. The PTC resistor may have 20 to 50 ohms resistance at ambient temperature and switch to greater than 3000 ohms as heretofore described. The fast transients and radio frequency signals pass through the capacitor and the clamp circuit 82 responds within a few nanoseconds to any overvoltage condition. The inductor 78 blocks the fast transients and radio frequency signals such that the PTC resistor 76 operates with lower frequency signals and DC. If lower frequency or DC response is not desirable, inductor 78 and PTC resistor 76 may be omitted from the circuit. The protection device shown in FIG. 7 then operates in the same manner as described in connection with FIG. 1.

From the foregoing description it will be apparent that it has been provided improved passive overvoltage protection devices capable of operating with overvoltages which can range from fast transients down to DC and with currents which range between tens of milliamperes up to tens of kiloamperes. Variations and modifications in the herein described devices, within the scope of the invention, will undoubtedly suggest themselves to those skilled in the art. Accordingly, the foregoing description should be taken as illustrative and not in a limiting sense.

I claim:

1. An overvoltage protection device for overvoltages which appear on a line connected to the input of the device, which line transmits signals with respect to an electrical circuit connected to the output of said device, said protection device comprising an element having a resistance which decreases when an overvoltage is present on said line to a value much less than the resistance presented by said circuit to said output, said element being connected in shunt with said line across said output, and means presenting an inductive reactance greater than the inductive reactance presented to said line by said element and of sufficient magnitude to enable the resistance of the element to decrease to said much less value before said overvoltage reaches the output of said device and said electrical circuit connected thereto, said inductive reactance presenting means being connected between said element and said output.

2. The overvoltage protection device according to claim 1 wherein said device comprises a printed circuit board on which said element is disposed, a trace on said board connecting said element in shunt with said line, and a trace on said board connecting said element to said output, said trace connecting to said output having a plurality of bends greater in number than the trace connecting said element to said line and a length greater than the length of said element and its connecting trace.

3. The overvoltage protection device according to claim 1 wherein said device comprises a zener diode, a pair of conductors connected at the input of said device to said line, said zener diode being connected between said conductors, and said inductive reactance presenting means being connected between at least one of said conductors and said output.

4. The overvoltage protection device according to claim 3 further comprising a printed circuit board having a first pair of traces providing connections to said input and thence to a pair of conductors providing said line, said zener diode having leads connecting it between said traces, said board having a second pair of traces providing connections to said output and thence to said circuit, at least one of said second pair of traces having a plurality of bends greater in number than the bends in said leads and between said leads and said first pair of conductors, and a length greater than the length of said, zener diode and its leads to provide said inductive reactance presenting means.

5. The overvoltage protection device according to claim 1 further comprising a second element having a resistance which decreases to a value much less than the resistance of said input when a voltage greater than the voltage which results in the decrease in resistance of said first named element occurs, said second element being characterized by a much greater current carrying capacity than said first element, said second element being connected in shunt with said line between said input and said first element, and a resistor connected in series with said line between said first and second elements.

6. The overvoltage protection device according to claim 5 wherein said first element is at least one avalanche device and said second element is a spark gap device.

7. The overvoltage protection device according to claim 5 further comprising a second resistor connected in series with said line between said second element and said input, said second resistor having a positive temperature coefficient which switches the resistance presented by said second resistor from a slowly increasing resistance of relatively low value to a resistance of relatively high value.

8. The overvoltage protection device according to claim 5 wherein said first element consists of at least one avalanche diode having a current carrying capacity such that it destructs when the power dissipated therein exceeds about five watts, said resistor has a positive temperature coefficient which switches the resistance presented by said resistor from a slowly increasing resistance of relatively low value to a resistance of relatively high value and limits the current through said first element below its said current carrying capacity before said greater voltage is reached.

9. The overvoltage protection device according to claim 6 further comprising a printed circuit board having a plurality of traces which provides the connections between said input and output, said spark gap, said resistor and said avalanche device, one of said traces between said avalanche device and said output having a plurality of bends greater in number than in the shunt provided by said avalanche device, and a length greater than a length of the shunt provided by said avalanche device to define said inductance means.

10. The overvoltage protection device according to claim 9 wherein said input has as least one pair of terminals and said output has at least one pair of terminals, said pair of input terminals providing connections to a pair of conductors of said transmission line, said output terminals providing connection to said electrical circuit which is protected by said device, said traces defining first and second paths which connect the first said pair of input terminals with the first of said pair of output terminals, respectively, said spark gap and avalanche device being mounted on said board and connected in shunt between the first path trace and the second path trace, said resistor being connected in series in said first path trace between the one of the ends of said spark gap and the one of the ends of said avalanche device which are connected to said first path trace, said trace defining said inductance means being the portion of said first path trace between said one end of said avalanche device and said output.

11. The overvoltage protection device according to claim 10 wherein said traces are on one side of said board and said spark gap, resistor, and avalanche device are on the opposite side of said board.

12. The overvoltage protection device according to claim 11 wherein said spark gap is cylindrical and has terminals at opposite ends thereof, said spark gap being disposed with its axis perpendicular to the side surface of said board on which it is mounted and with one end of said spark gap in juxtaposition with said last named side surface of said board, a bus bar extending through said board and connected to said second path trace and also connected to the other end of said spark gap.

13. The overvoltage protection device according to claim 12 wherein the terminal on said one end of said spark gap has a lead extending therefrom, said lead being disposed for substantially its entire length along and in contact with said first path trace.

14. The overvoltage protection device according to claim 11 wherein said second path trace is adapted to be connected to the ground or common conductor of said line or the ground or common circuit which is protected by said device, said second path trace having a portion defining a band which is disposed adjacent to said resistor on the opposite side of said board therefrom to intercept electrical discharge between the ends of said resistor.

15. The overvoltage protection device according to claim 14 further comprising a bus bar on the side of said board on which said resistor is mounted and disposed between said board and said resistor and extending in the direction of said band, said bus bar extending through said board and being connected to said second path trace.

16. The overvoltage protection device according to claim 10 wherein said board has mounted on said one side thereof a plurality of sets each containing a separate one of said spark gap, resistor and avalanche device and defining a plurality of outputs and a plurality of inputs, connections for input and output connectors adjacent opposite ends of said board to which said inputs and said outputs are connected.

17. The overvoltage protection device according to claim 16 wherein said second path trace is common to said sets, a plurality of said first path traces are provided, each individual to a different one of said sets, and said first path traces including said inductance means.

18. The overvoltage protection device according to claim 17 wherein said spark gaps are cylindrical and disposed in a row with their axes perpendicular to said board on the same side of said board, said spark gaps having terminals on one end thereof adjacent to said one side of said board having leads extending therefrom through said board and connected to said first path traces of their respective sets, and bus bar bridging the opposite ends of said spark gaps and connected in common to terminals on said opposite ends of said spark gaps and through said board to said common trace.

19. The overvoltage protection device according to claim 18 wherein said common trace has a portion defining a band dispose transversely to the resistors of each of said sets.

20. The overvoltage protection device according to claim 18 further comprising a flexible conductor having a capacity to carry heavier current than said traces, said flexible conductor being connected to said bus bar and providing a connection to ground.

21. The overvoltage protection device according to claim 4 wherein there are at least twice the number of bends and twice the length in said one of said second pair of traces between said avalanche diode said output than in the shunt path between said traces defined by said avalanche device and its said leads.

22. The overvoltage protection device according to claim 8 wherein said line and said circuit are balanced, said spark gap defining at least three terminals connected respectively to different terminals of said input and to common, said avalanche device being bipolar and being connected to different terminals of said output, another pair of bipolar avalanche devices connected between said commonly and separately to different ones of said output terminals, a pair of said positive temperature coefficient resistors separately connected between different ones of said input terminals and different ones of said output terminals, and a pair of inductance means separately connected to opposite ends of said first name avalanche device and different ones of said output terminals.

23. In a transient overvoltage protective device having a breakdown element and a clamping element operative to breakdown at higher and lower voltages, respectively, said breakdown element being connected in shunt with the input of said device which is adapted to be connected to a signal line, and said clamping element being connected in shunt with the output of said device to the circuit to be protected, a pair of transmission circuits in series with said input and output and between said breakdown and clamping elements, said transmission circuits being in parallel with each other at least one of said transmission circuits being a low frequency transmission circuit comprising an inductor in series with a positive temperature coefficient resistor and the other being a high frequency transmission circuit comprising a capacitor.

24. The invention according to claim 23 wherein said device further includes means defining an inductance greater than the inductance presented in said shunt provided by said clamping element, and connected in series of said output and said clamping element.

25. The invention according to claim 24 wherein the breakdown element is a spark gap and said clamping element includes an avalanche diode in series with a fast-recovery rectifier.

* * * * *